(12) United States Patent
Liang (10) Patent No.: US 8,270,160 B2
(45) Date of Patent: Sep. 18, 2012

(54) ROTATING MECHANISM AND ELECTRONIC DEVICE USING SAME

(75) Inventor: Shi-Xu Liang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 177 days.

(21) Appl. No.: 12/862,861

(22) Filed: Aug. 25, 2010

(65) Prior Publication Data

US 2011/0286158 A1 Nov. 24, 2011

(30) Foreign Application Priority Data

May 20, 2010 (CN) .......................... 2010 1 0178572

(51) Int. Cl.
*H05K 7/00* (2006.01)
*H04M 1/03* (2006.01)

(52) U.S. Cl. .............. 361/679.56; 361/679.01; 455/566; 455/575.1; 455/575.4; 16/348; 16/359; 74/100.1; 248/292.13

(58) Field of Classification Search ............. 361/679.01, 361/679.56; 16/348, 357–361, 366, 371, 16/374; 74/100.1; 248/292.13, 349.1; 379/330, 379/433.12–433.13; 455/566, 575.1, 575.4
See application file for complete search history.

(56) References Cited

U.S. PATENT DOCUMENTS

| | | | | |
|---|---|---|---|---|
| 7,084,345 B1 * | 8/2006 | Chen et al. | ..................... | 174/545 |
| 7,159,833 B2 * | 1/2007 | Kato | ......................... | 248/349.1 |
| 7,194,290 B2 * | 3/2007 | Matsunami | ................. | 455/575.1 |
| 7,376,450 B2 * | 5/2008 | Chen | ........................... | 455/575.4 |
| 7,478,972 B2 * | 1/2009 | Takamori et al. | .......... | 403/409.1 |
| 7,496,389 B2 * | 2/2009 | Cho et al. | .................... | 455/575.4 |
| 7,546,150 B2 * | 6/2009 | Makino | ....................... | 455/575.1 |
| 7,567,830 B2 * | 7/2009 | Hur | .............................. | 455/575.4 |
| 7,752,712 B2 * | 7/2010 | Chuan | ............................. | 16/358 |
| 7,818,038 B2 * | 10/2010 | Huang | ........................ | 455/575.4 |
| 7,904,127 B2 * | 3/2011 | Saitoh | ........................ | 455/575.4 |
| 7,925,313 B2 * | 4/2011 | Kajihara et al. | ........... | 455/575.1 |
| 7,930,008 B2 * | 4/2011 | Ko | ............................... | 455/575.4 |
| 7,953,463 B2 * | 5/2011 | Misawa | ...................... | 455/575.1 |
| 7,966,048 B2 * | 6/2011 | Misawa | ...................... | 455/575.1 |
| 7,970,444 B2 * | 6/2011 | Thornton et al. | .......... | 455/575.4 |
| 7,986,981 B2 * | 7/2011 | Jin et al. | ..................... | 455/575.1 |
| 7,986,982 B2 * | 7/2011 | Li et al. | ...................... | 455/575.1 |
| 8,014,842 B2 * | 9/2011 | Kuga et al. | ................. | 455/575.4 |
| 8,122,568 B2 * | 2/2012 | Jin et al. | ......................... | 16/357 |
| 8,155,718 B2 * | 4/2012 | Byun et al. | ................. | 455/575.4 |
| 8,165,648 B2 * | 4/2012 | Higashigawa et al. | ..... | 455/575.3 |
| 8,170,632 B2 * | 5/2012 | Hsu | .............................. | 455/575.4 |
| 8,200,296 B2 * | 6/2012 | Arakane et al. | ............ | 455/575.3 |
| 2007/0171195 A1 * | 7/2007 | Kim et al. | ..................... | 345/156 |
| 2008/0004083 A1 * | 1/2008 | Ohki et al. | .................... | 455/566 |

(Continued)

*Primary Examiner* — Robert J Hoffberg
(74) *Attorney, Agent, or Firm* — Altis Law Group, Inc.

(57) ABSTRACT

A rotating mechanism comprises a retaining plate having a track and a groove, both of which are defined in the retaining plate and parallel to each other; a rotating plate being capable of rotating in a plane parallel to the plane of the retaining plate by a shaft, the rotating plate has a slot and a slit, both of which are defined in the rotating plate and extending along a imaginary line; a biasing member including a first biasing member end and a second biasing member end; a peg retained on the first biasing member end and extending into the groove and the slot; a rail retained on the second biasing member end and extending into the track and the slit.

16 Claims, 7 Drawing Sheets

U.S. PATENT DOCUMENTS

| | | | |
|---|---|---|---|
| 2008/0076493 A1* | 3/2008 | Seo et al. | 455/575.4 |
| 2008/0125201 A1* | 5/2008 | Kim et al. | 455/575.4 |
| 2008/0132288 A1* | 6/2008 | Misawa | 455/566 |
| 2008/0176607 A1* | 7/2008 | Jin et al. | 455/566 |
| 2008/0242380 A1* | 10/2008 | Kajihara et al. | 455/575.4 |
| 2010/0029348 A1* | 2/2010 | Lee et al. | 455/575.4 |
| 2010/0137041 A1* | 6/2010 | Lee | 455/575.4 |
| 2010/0178963 A1* | 7/2010 | Iwaki | 455/575.4 |
| 2010/0214726 A1* | 8/2010 | Kubota | 361/679.01 |
| 2011/0045879 A1* | 2/2011 | Kim et al. | 455/575.4 |
| 2011/0051336 A1* | 3/2011 | Yamagiwa et al. | 361/679.01 |
| 2011/0143818 A1* | 6/2011 | Makino et al. | 455/566 |
| 2011/0287815 A1* | 11/2011 | Liang | 455/575.1 |
| 2011/0287816 A1* | 11/2011 | Liang | 455/575.1 |
| 2011/0287817 A1* | 11/2011 | Liang | 455/575.1 |
| 2011/0299230 A1* | 12/2011 | Kubota | 361/679.01 |
| 2012/0120574 A1* | 5/2012 | Lee | 361/679.01 |
| 2012/0122523 A1* | 5/2012 | Liang | 455/566 |

* cited by examiner

ROTATING MECHANISM AND ELECTRONIC DEVICE USING SAME

CROSS-REFERENCE TO RELATED APPLICATIONS

This application is related to co-pending U.S. patent applications Ser. Nos. 12/862,858, 12/862,859 and 12/862,860, entitled "ROTATING MECHANISM AND ELECTRONIC DEVICE USING SAME", by Liang Shi-Xu. These applications have the same assignee as the present application and have been concurrently filed herewith. The above-identified applications are incorporated herein by reference.

BACKGROUND

1. Technical Field

This disclosure relates to rotating mechanisms, particularly to rotating mechanisms used in an electronic device.

2. Description of Related Art

A typical portable electronic device, such as a mobile phone, generally includes a lower element and an upper element with a display mounted thereon. However, many conventional electronic devices use complicated components and methods to enable relative rotation connecting the upper and lower elements.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary rotating mechanism for electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
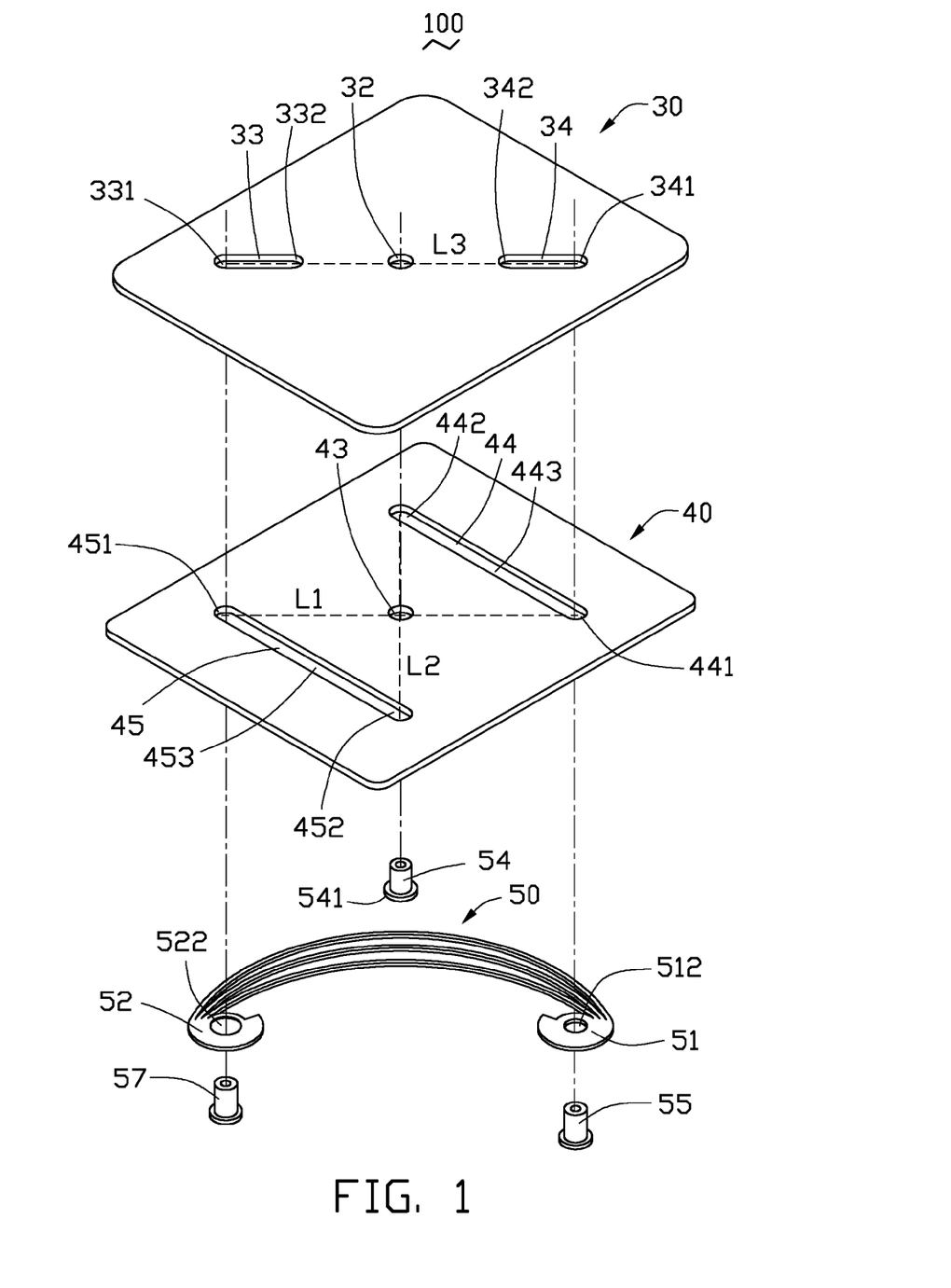
FIG. 1 is an exploded view of an exemplary embodiment of a rotating mechanism.
Figure 2:
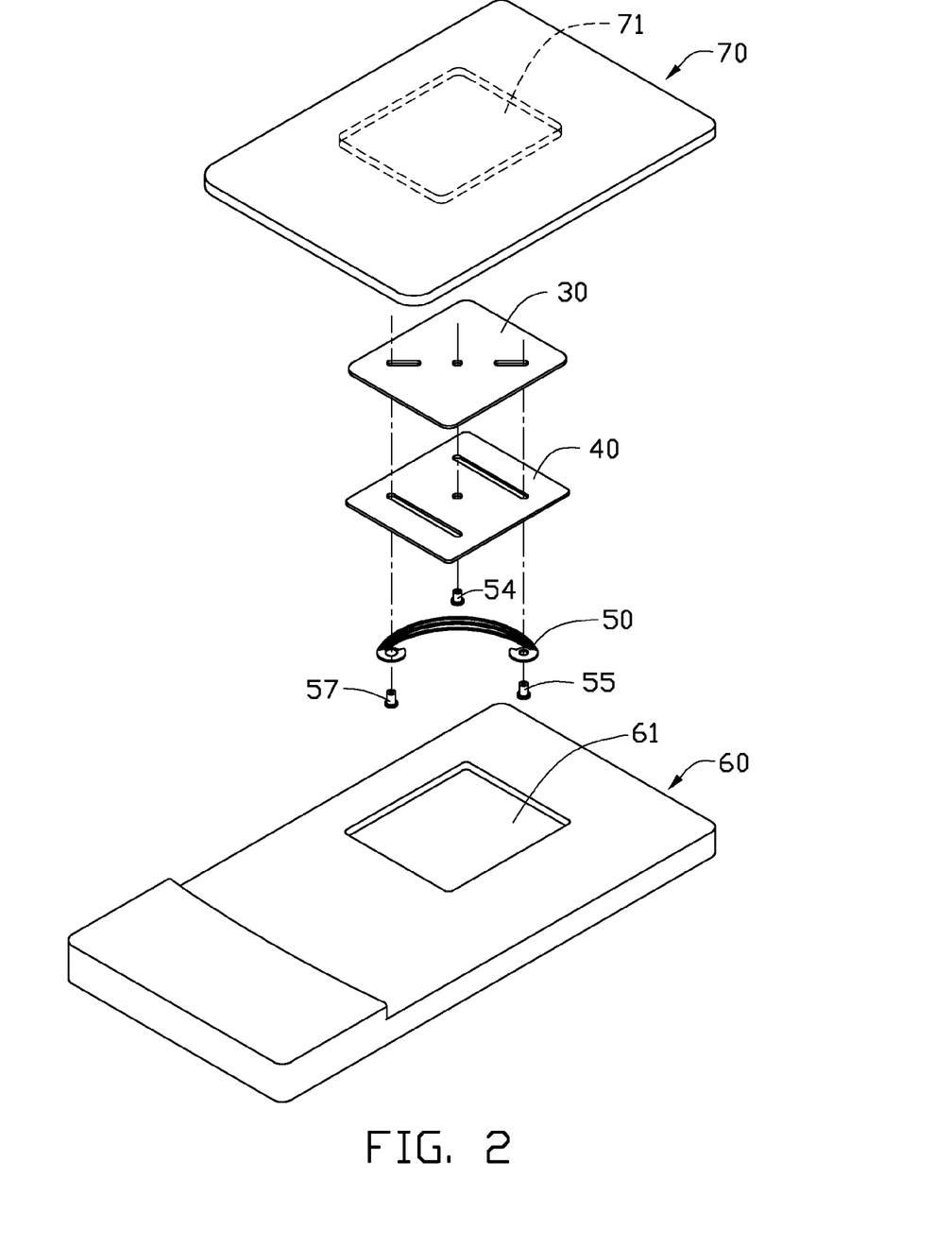
FIG. 2 is an exploded view of an electronic device using the rotating mechanism shown in FIG. 1.
Figure 3:
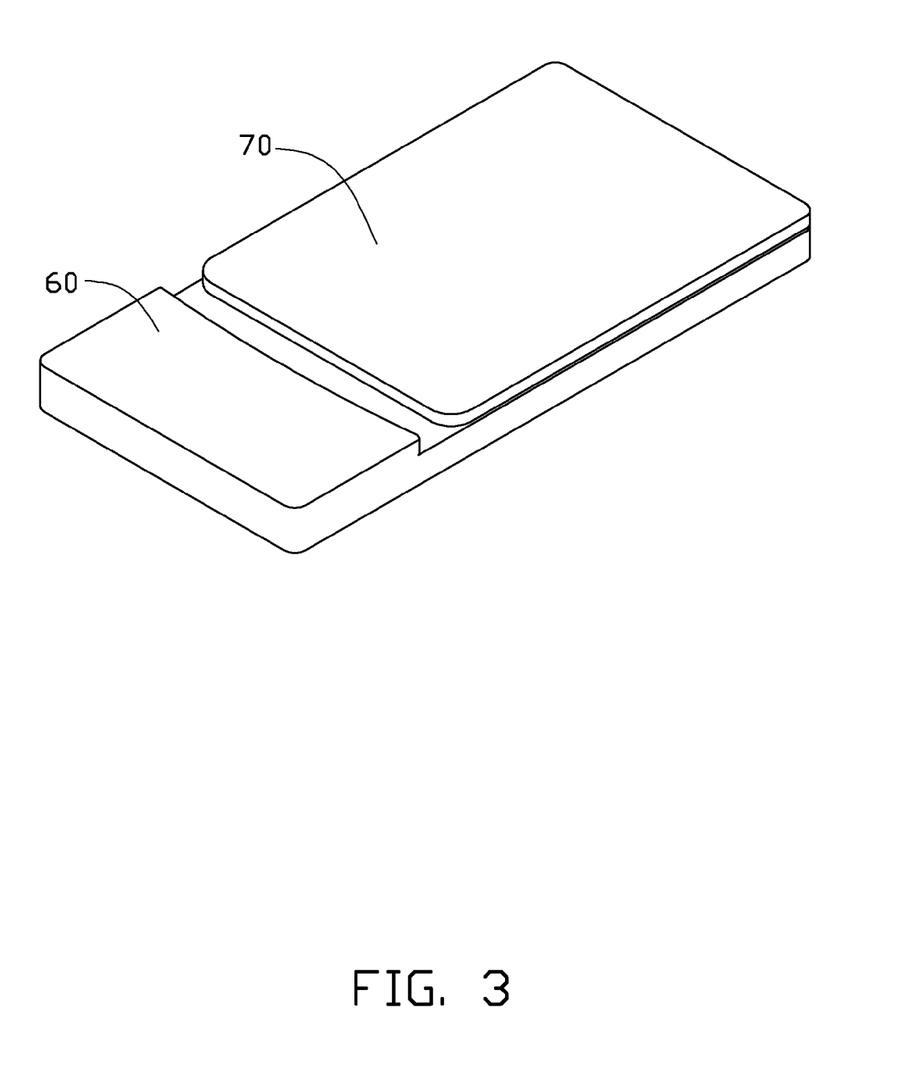
FIG. 3 is an assembled view of the electronic device shown in FIG. 2.

FIG. 1 illustrates an exploded view of an exemplary rotating mechanism 100. FIG. 2 illustrates an exploded view of an electronic device (not labeled) using the rotating mechanism 100 shown in FIG. 1. The electronic device includes an upper housing 70 and a lower housing 60, which are connected by the rotating mechanism 100. The upper housing 70 defines a receptacle 71 facing the lower housing 60 and the lower housing 60 defines a compartment 61 facing to the receptacle 71. The receptacle 71 and the compartment 61 cooperatively accommodate the rotating mechanism 100.

The rotating mechanism 100 includes a retaining plate 40 and a rotating plate 30 which are rotatably coupled by a rotation enabling member (not labeled) as described below. The retaining plate 40 is mounted to the lower housing 60 and the rotating plate 30 is mounted to the upper housing 70 so the upper housing 70 can rotate with the rotating plate 30 relative to the lower housing 60 when the rotating plate 30 rotates relative to the retaining plate 40. The rotation enabling member is coupled connecting the retaining plate 40 and the rotating plate 30 so the rotating plate 30 rotatably engages with the retaining plate 40. The rotation enabling member, in this exemplary embodiment, comprises a shaft 54 coupled connecting the rotating plate 30 and the retaining plate 40 so the rotating plate 30 can rotate in a plane parallel to the plane of the retaining plate 40. The shaft 54, in this exemplary embodiment, is retained on or rotatably affixed to the rotating plate 30 and rotatably engages with the retaining plate 40 so the rotating plate 30 can rotate about the shaft 54 relative to the retaining plate 40. In an exemplary embodiment, the shaft 54 is retained in a securing hole 32 defined in the rotating plate 30 and extends into an shaft hole 43 defined in the retaining plate 40, and the shaft 54 is slightly smaller than the shaft hole 43 so the shaft 54 can rotate in the shaft hole 43 relative the retaining plate 40. A distal end 541 of the shaft 54 is wider than the shaft hole 43 so the shaft 54 will not pass through the shaft hole 43 thereby retaining the rotating plate 30 to the retaining plate 40. As the rotating plate 30 rotates relative to the retaining plate 40, the shaft 54/shaft hole 43 combination prevent the rotating plate 30 and the retaining plate 40 from separating.

The rotation enabling member further includes a groove 44, a track 45 having the same shape and size as the groove 44, a slot 34, a slit 33 having the same shape and size as the slot 34, a biasing member 50 including a first biasing member end 51 and a second biasing member end 52, a peg 55 retained on the first biasing member end 51 and a rail 57 retained on or rotatably affixed to the second biasing member end 52. The track 45 and the groove 44 are both defined in the retaining plate 40 and respectively located at opposite sides of the shaft hole 43, and the track 45 is parallel to the groove 44. The track 45 includes a first track end 451 and a second track end 452, the groove 44 includes a first groove end 441 opposite to the second track end 452 and a second groove end 442 opposite to the first track end 451. The imaginary line L1 connecting the first track end 451 and the first groove end 441 is perpendicular to the imaginary line L2 connecting the second track end 452 and the second groove end 442, and the shaft hole 43 is defined at the intersecting point connecting the imaginary line L1 and the imaginary line L2.

The slot 34 and the slit 33 are both defined in the rotating plate 30 and respectively located at two opposite sides of the securing hole 32; and the slot 34, the securing hole 32 and the slit 33 is lying on the same imaginary line L3. The slot 34 includes a first slot end 341 and a second slot end 342, the slit 33 includes a first slit end 331 and a second slit end 332 facing the second slot end 342. When the rotating mechanism 100 is located in a first position shown in FIG. 4, the imaginary line L3 overlaps with the imaginary line L1; the first slot end 341 is aligned with the first groove end 441, and the peg 55 extends into the first slot end 341 and the first groove end 441; and the first slit end 331 is aligned with the first track end 451, and the rail 57 extends into the first slit end 331 and the first track end 451.

The biasing member 50 may be a spring in this exemplary embodiment. The first biasing member end 51 defines a first latching hole 512, the peg 55 is retained in the first latching hole 512 to the hold the peg 55 to the first biasing member end 51. The second biasing member end 52 defines a second latching hole 522, and the rail 57 is retained in the second latching hole 522 to hold the rail 57 to the second biasing member end 52.

Referring to FIGS. 1-4, in assembly, the securing hole 32 is aligned with the shaft hole 43, the first slot end 341 is aligned with the first groove end 441, and the first slit end 331 is aligned with the first track end 451. The shaft 54 is inserted in the securing hole 32 and the shaft hole 43 so the rotating plate 30 can rotate in a plane parallel to the plane of the retaining plate 40. The peg 55 is retained in the first latching hole 512 and then extends into the first groove end 441 and the first slot end 341. The rail 57 is retained in the second latching hole 522 and then extends into the first track end 451 and the first slit end 331. Finally, the rotating plate 30 is retained in the receptacle 71 to mount the rotating plate 30 to the upper housing 70 and the retaining plate 40 is retained in the compartment 61 to mount the retaining plate 40 to the lower housing 60. Thus, the electronic device is assembled and the imaginary line L3 overlaps with the imaginary line L1 so the electronic device is positioned in the first position shown in FIG. 3.

Figure 4:
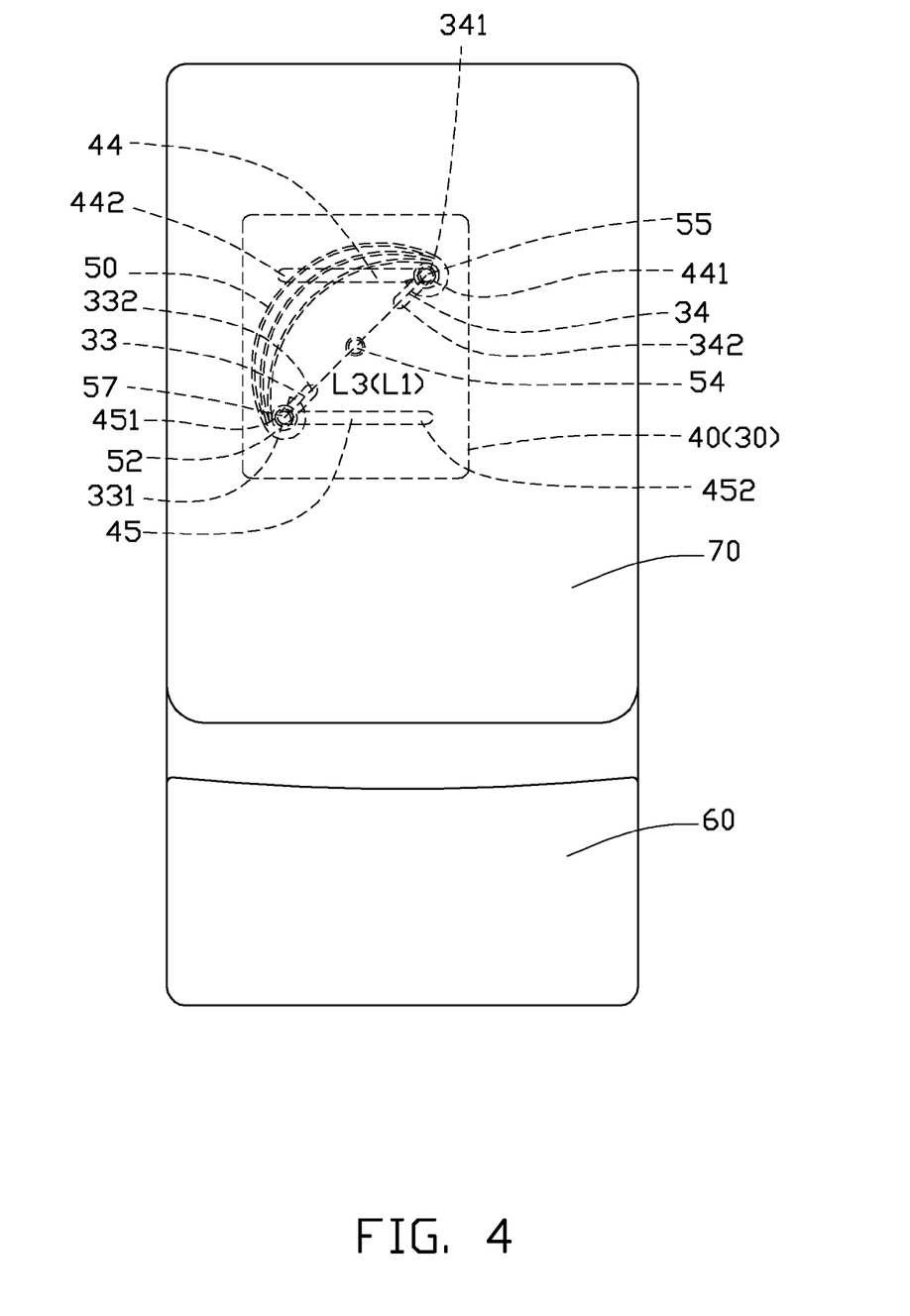
FIG. 4 is an assembled and partially perspective view of the electronic device in a first position.
Figure 5:
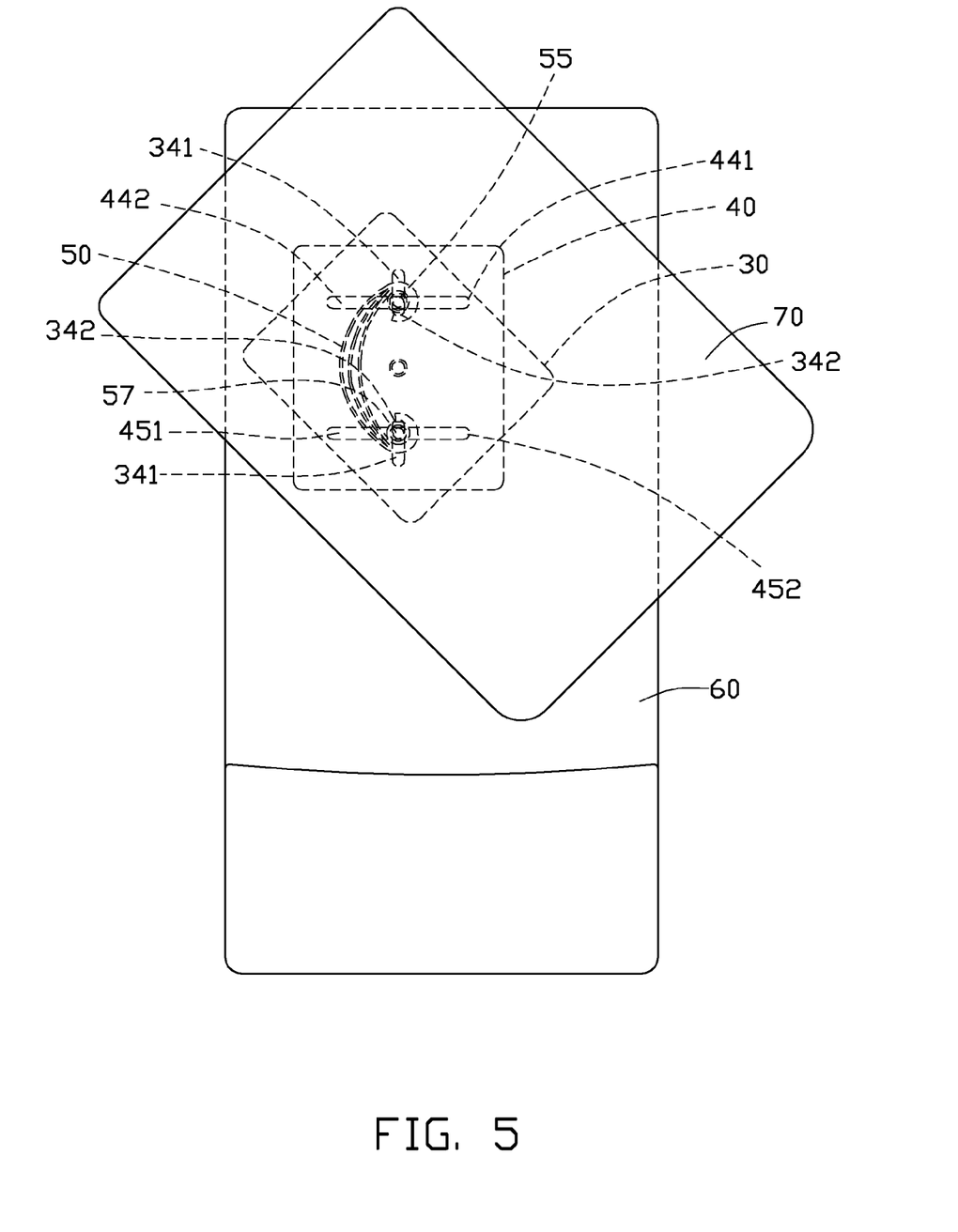
FIG. 5 is an assembled and partially perspective view of the electronic device in an intermediate position.
Figure 6:
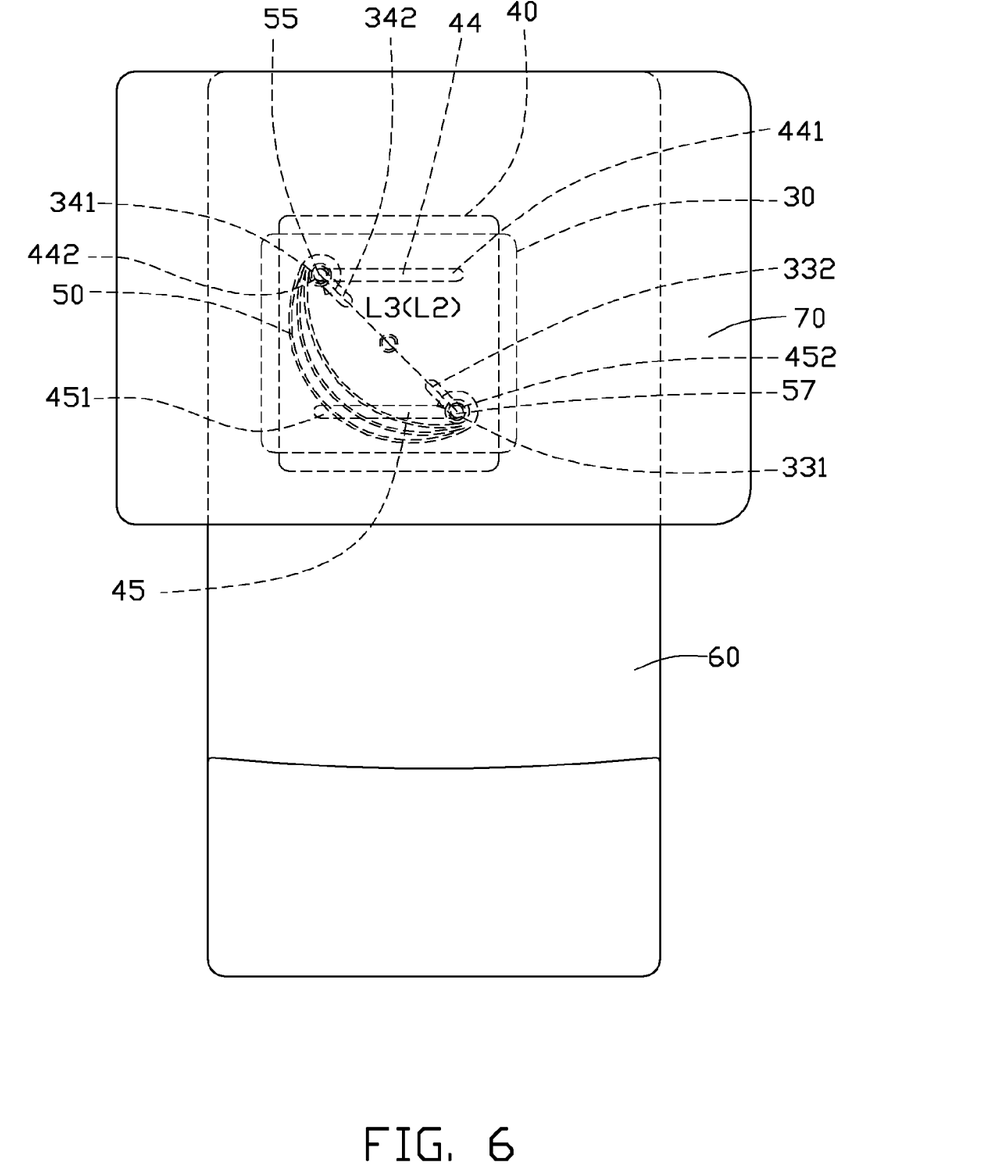
FIG. 6 is an assembled and partially perspective view of the electronic device in a third position.

Referring to FIGS. 4-6, in use, the upper housing 70 can rotates relative to the lower housing 60 by the rotating plate 30 rotating relative to the retaining plate 40. At this time, the peg 55 slides from the first groove end 441 to a center portion 443 of the groove 44 and simultaneously slides from the first slot end 341 to the second slot end 342, the rail 57 slides from the first track end 451 to the intermediate portion 453 of the track 45 and simultaneously slides from the first slit end 331 to the second slit end 332, and the biasing member 50 is compressed to exert force to the peg 55 and the rail 57. Once the rotating plate 30 transitions to the intermediate position shown in FIG. 5, the biasing member 50 begins to decompresses so the rotating plate 30 automatically further rotates toward a third position shown in FIG. 6 under the force of compressed biasing member 50 with the peg 55 slides from the center portion 443 of the groove 44 to the second groove end 442 and simultaneously slides from the second slot end 342 to the first slot end 341, and the rail 57 slides from the center portion 453 of the track 45 to the second track end 452 and simultaneously slides from the second slit end 332 to the first slit end 331. And when the rotating mechanism 100 is at the third position shown in FIG. 6, the imaginary line L3 overlaps with the imaginary line L2. Thus, the upper housing 70 is rotated relative to the lower housing 60 like shown in FIG. 6.

Figure 7:
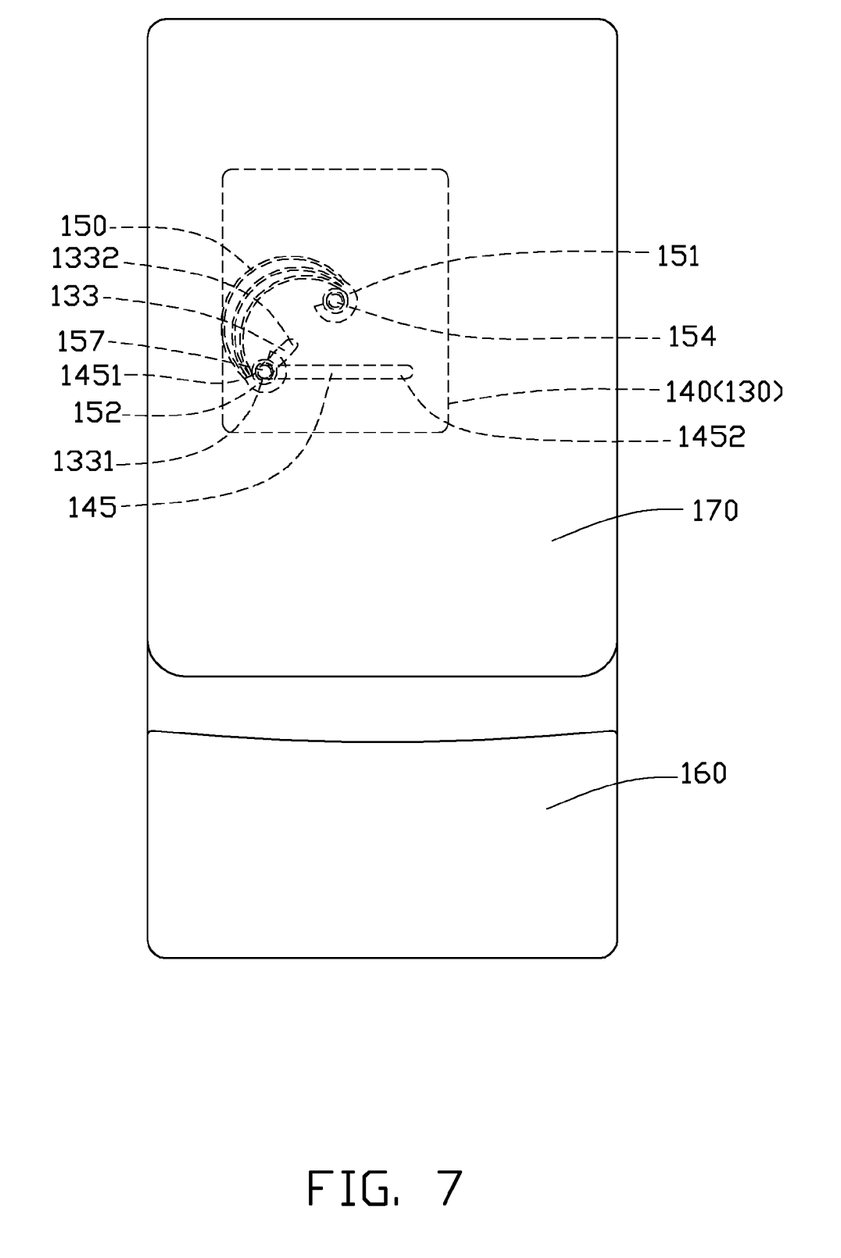
FIG. 7 is an assembled and partially perspective view of the electronic device in a third position using another exemplary embodiment of a rotating mechanism.

One alternative embodiment of the rotating mechanism is illustrated in FIG. 7 having a retaining plate 140 mounted to a lower housing 160 and a rotating plate 130 mounted to an upper housing 170. The retaining plate 140 has a track 145 defined therethrough. The track 145 includes a first track end 1451 and a second track end 1452. The rotating plate 130 is capable of rotating in a plane parallel to the plane of the retaining plate 140 by a shaft 154, the rotating plate 130 has a slit 133 defined therethrough, the shaft 154 and the slit 133 are oriented in a imaginary line. The slit 133 includes a first slit end 1331 and a second slit end 1332. The rotating mechanism further includes a biasing member 150 including a first biasing member end 151 retained on or rotatably affixed to the shaft 154 and a second biasing member end 152, and a rail 157 retained on or rotatably affixed to the second biasing member end 152 and extending into the track 145 and the slit 133. When the rotating mechanism is in a first position, the first track end 1451 is aligned with the first slit end 1331, and the rail 157 extends into the first track end 1451 and the first slit end 1331. When the rotating plate 130 rotates from the first position to an intermediate position, the rail 157 slides from the first track end 1451 to a center portion of the track 145 and simultaneously slides from the first slit end 1331 to the second slit end 1332, and the biasing member 150 is compressed to exert force on the rail 157. Once the rotating plate 130 transitions to the intermediate position, the biasing member 150 expands so the rotating plate 130 rotates toward an third position under the force of decompressing biasing member 150 as the rail 157 slides from the intermediate portion of the track 145 to the second track end 1452 and simultaneously slides from the second slit end 1332 to the first slit end 1331.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A rotating mechanism, comprising:
    a retaining plate having a track and a groove, both of which are defined in the retaining plate and parallel to each other;
    a rotating plate being capable of rotating in a plane parallel to the plane of the retaining plate by a shaft, the rotating plate having a slot and a slit, both of which are defined in the rotating plate and extending along a first imaginary line;
    a biasing member including a first biasing member end and a second biasing member end;
    a peg retained on the first biasing member end and slidably extending into the groove and the slot; and
    a rail retained on the second biasing member end and slidably extending into the track and the slit;
    wherein the biasing member is compressed or decompressed by the peg sliding in the groove and the slot, and with the rail sliding in the track and the slit when the rotating plate rotates parallel relative to the retaining plate.

2. The rotating mechanism claimed in claim 1, wherein the track includes a first track end and a second track end, the groove includes a first groove end opposite to the second track end and a second groove end opposite to the first track end; a second imaginary line of the first track end and the first groove end and a projection of the first imaginary line are coincident with each other when the rotating mechanism is in a first position.

3. The rotating mechanism claimed in claim 2, wherein a third imaginary line of the second track end and the second groove end and the projection of the first imaginary line are coincident with each other when the rotating mechanism is in a third position.

4. The rotating mechanism claimed in claim 3, wherein the slot includes a first slot end and a second slot end, the slit includes a first slit end and a second slit end facing the second slot end; when the rotating mechanism is located in the first position, the first slot end is aligned with the first groove end, and the peg extends into the first slot end and the first groove end; and the first slit end is aligned with the first track end, and the rail extends into the first slit end and the first track end.

5. The rotating mechanism claimed in claim 4, wherein when the rotating plate rotates from the first position to an intermediate position, the peg slides from the first groove end to a center portion of the groove and simultaneously slides from the first slot end to the second slot end, and the rail slides from the first track end to a center portion of the track and simultaneously slides from the first slit end to the second slit end, and the biasing member is compressed to exert force to the peg and the rail.

6. The rotating mechanism claimed in claim 5, wherein once the rotating plate crosses the intermediate position, the biasing member expands so the rotating plate automatically further rotates toward the third position under the force of compressed biasing member with the peg slides from the center portion of the groove to the second groove end and simultaneously slides from the second slot end to the first slot end, and the rail slides from the center portion of the track to the second track end and simultaneously slides from the second slit end to the first slit end.

7. The rotating mechanism claimed in claim 2, wherein the second imaginary line is perpendicular to the third imaginary line.

8. The rotating mechanism claimed in claim 7, wherein the shaft is retained on the rotating plate and rotatably engages with the retaining plate so the rotating plate can rotate about the shaft relative to the retaining plate.

9. The rotating mechanism claimed in claim 8, wherein the shaft is retained in a securing hole defined in the rotating plate and extends into an shaft hole defined in the retaining plate, and the shaft is slightly smaller than the shaft hole so the shaft can rotate in the shaft hole relative the retaining plate.

10. The rotating mechanism claimed in claim 9, wherein a distal end of the shaft is wider than the shaft hole so the shaft will not pass through the shaft hole thereby retaining the rotating plate to the retaining plate.

11. The rotating mechanism claimed in claim 9, wherein the shaft hole is defined at an intersecting point connecting the second imaginary line and the third imaginary line.

12. An electronic device, comprising:
   an upper housing;
   an lower housing; and
   a rotating mechanism comprising:
      a retaining plate mounted to the lower housing;
      a rotating plate mounted to the upper housing; and
      a rotation enabling member comprising a shaft coupled connecting the rotating plate and the retaining plate so the rotating plate can rotate in parallel relative to the retaining plate, a groove, a track, a slot, a slit, a biasing member including a first biasing member end and a second biasing member end, a peg rotatably affixed to the first biasing member end and a rail rotatably affixed to the second biasing member end;
   wherein the track and the groove are defined in the retaining plate and respectively located at opposing sides of the shaft, and the track is parallel to the groove;
   wherein the slot and the slit are defined in the rotating plate and respectively located at opposing sides of the shaft;
   wherein the slot, the shaft and the slit are lying on a first imaginary line; and
   wherein the peg extends into the groove and the slot and the rail extends into the track and the slit.

13. The electronic device claimed in claim 12, wherein the track includes a first track end and a second track end, the groove includes a first groove end opposite to the second track end and a second groove end opposite to the first track end; a second imaginary line of the first track end and the first groove end and a projection of the first imaginary line are coincident with each other when the rotating mechanism is in a first position.

14. The electronic device claimed in claim 13, wherein a third imaginary line of the second track end and the second groove end and the projection of the first imaginary line are coincident with each other when the rotating mechanism is in a third position.

15. The electronic device claimed in claim 14, wherein the slot includes a first slot end and a second slot end, the slit includes a first slit end and a second slit end facing the second slot end; when the rotating mechanism is located in the first position, the first slot end is aligned with the first groove end, and the peg extends into the first slot end and the first groove end; and the first slit end is aligned with the first track end, and the rail extends into the first slit end and the first track end.

16. The electronic device claimed in claim 15, wherein when the rotating plate rotates from the first position to an intermediate position, the peg slides from the first groove end to a center portion of the groove and simultaneously slides from the first slot end to the second slot end, and the rail slides from the first track end to a center portion of the track and simultaneously slides from the first slit end to the second slit end, and the biasing member is compressed to exerts force to the peg and the rail.

* * * * *